July 8, 1969     E. J. GOLDENTHAL     3,454,763
STEREOSCOPIC DENTAL X-RAY APPARATUS AND METHOD FOR
POSITIONING THE X-RAY CONE FOR EXPOSURE
Filed May 19, 1966
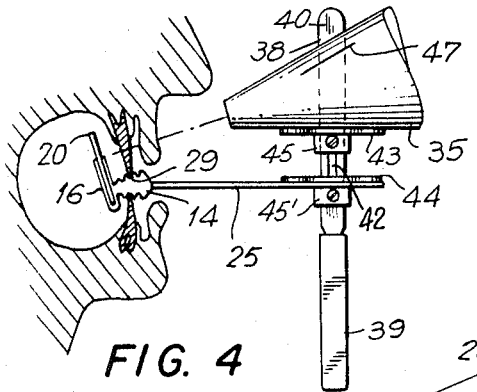
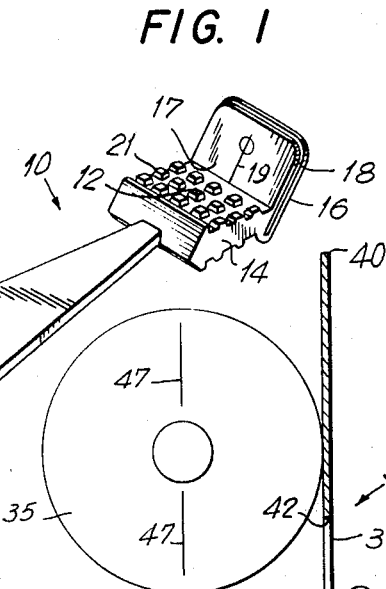
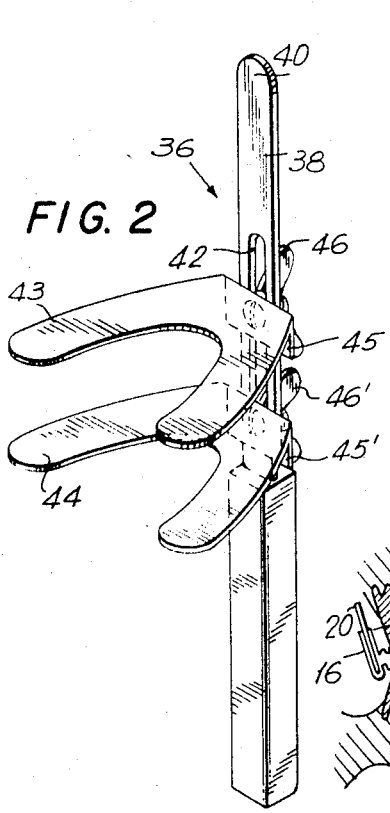
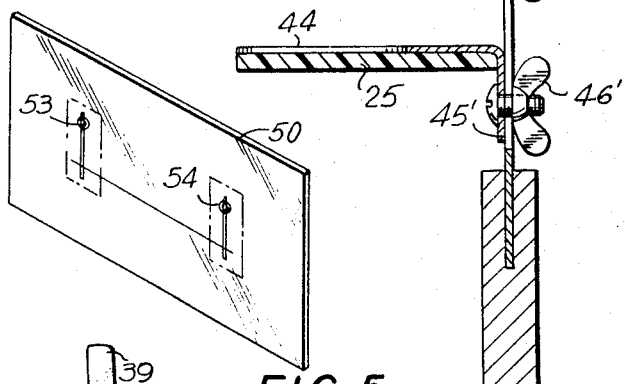
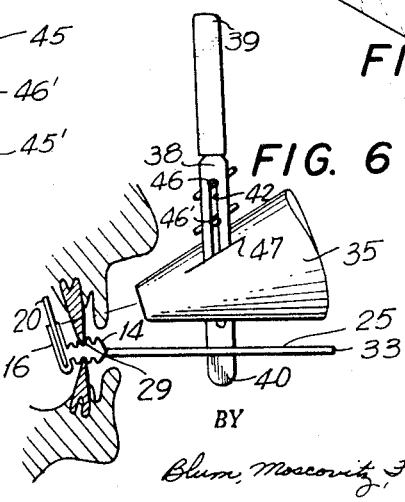
INVENTOR.
EDGAR J. GOLDENTHAL
BY
Blum, Moscovitz, Friedman, Blum & Kaplan
ATTORNEYS

# United States Patent Office 3,454,763
Patented July 8, 1969

3,454,763
STEREOSCOPIC DENTAL X-RAY APPARATUS AND METHOD FOR POSITIONING THE X-RAY CONE FOR EXPOSURE
Edgar J. Goldenthal, 240 Central Park S., New York, N.Y. 10019
Filed May 19, 1966, Ser. No. 551,392
Int. Cl. G01n 23/04
U.S. Cl. 250—61
10 Claims

ABSTRACT OF THE DISCLOSURE

A stereoscopic dental X-ray apparatus and method in which an X-ray cone is aligned to direct the central rays produced thereby toward film mounted on a vertically extended back plate affixed to one end of a bite block and disposed within the mouth, in a direction parallel with each of the side edges of a flat wedge member extending horizontally from the other end of said block and focus said rays from points on said side edges at which the separation of said side edges is equal to the interpupillary distance.

---

This invention is directed to a new device and method for taking stereoscopic dental X-ray films of the human mouth by means of an X-ray cone. More particularly this invention relates to a new and novel device for taking X-ray films of the human mouth by means of an X-ray cone wherein the device comprises a new and novel X-ray film holder and means for aligning the cone with the X-ray film holder.

In order to take a stereoscopic dental X-ray of a portion of the mouth it is necessary to take successively two X-ray films of the exact same portion with the X-ray cone positioned at opposite angles from the center of the central axis of the film which is held in the mouth. Furthermore the distance between the positions of the X-ray cone during the taking of the two films must be equal to the interpupillary distance. Previously it has been very difficult to take stereoscopic dental X-ray films due to the necessity of exact positioning of the X-ray film within the mouth in relation to the X-ray cone from which the X-rays emanate. Furthermore, these two X-ray films must be positioned in exactly the same position in the mouth in order that a three-dimensional stereoscopic effect be obtained. If the positioning of the two films with respect to each other is not correct or if the positioning of each film with respect to the X-ray cone is not correct, no three-dimensional stereoscopic effect will be produced.

Various methods and apparatus have been utilized to take dental stereoscopic X-ray films. However, due to the complex structure and design of these devices, none of these devices has proven to be practical. This is especially true since these devices are very expensive and difficult to handle by the ordinary dentist. Therefore the taking of stereoscopic dental X-rays has not been employed as part of every day dental practice.

It is an object of this invention to provide a stereoscopic X-ray device of simple design and construction that will take stereoscopic X-ray films of a portion of the human mouth which can be utilized in every day dental practice.

It is a further object of this invention to provide a method for making stereoscopic dental X-rays of the human mouth quickly and easily which can be utilized in every day dental practice.

It is a further object of this invention to provide a holder for a dental X-ray film which can be readily inserted into the human mouth and can guide the operator to the proper positioning of the X-ray cone for taking the films necessary to produce a stereoscopic view of a portion of the human mouth.

It is a further object of this invention to provide a dental X-ray holder which can be utilized in taking stereoscopic X-ray films of the mouth, said holder being simple and inexpensive in construction, sanitary in use, easy to manipulate and capable of being rigidly held by the patient between his teeth with no discomfort or other inconvenience.

The novel device for taking stereoscopic dental X-ray films of the mouth by means of a dental X-ray cone, in accordance with this invention comprises an angulator having a holder for holding X-ray film in the mouth and a portion extending out of the mouth which enables the X-ray cone to be aligned with the film in the mouth and a means for aligning the X-ray cone with the portion of the holder extending out of the mouth. In this manner, the X-rays can be directed on to two successive films held in a single position by the holder so that a stereoscopic X-ray film of a portion of the mouth will be taken.

The dental X-ray angulator in accordance with this invention comprises a bite block which is adapted to be held in the mouth between the teeth, a vertically extending back plate for an X-ray film which is affixed to one end of the block which contains means therein for retaining an X-ray film within the plate. The bite block has affixed thereto a wedge member which extends horizontally from the other end of the block so that its horizontal axis makes an obtuse angle, preferably about 120°, with the vertical axis of the plate. Furthermore the wedge member has two side edges which taper outwardly from the vertical axis of the block, these side edges each having a point thereon where the separation of the side edges becomes equal to the interpupillary distance. The points where the side edges are separated from each other by the interpupillary distance are equally spaced from the vertical axis or central point of the bite block along each of their respective side edges.

The alignment means positions the cone and X-rays directed therethrough with respect to the side edge of the wedge of the angulator at each of the points thereon where the side edges are separated by the interpupillary distance so that the X-rays emanating therefrom can be directed toward the film held in the mouth parallel with each of the side edges of the wedge. In accordance with this invention the alignment means comprises a flat vertically extending blade having a central groove and spaced parallel upper and lower projections which extend perpendicularly from the central groove of the blade. The bottom projection is preferably stationary whereas the top projection preferably can move up and down within the groove of the blade so that the distance of separation between the projections can be adjusted as desired. The top portion of the blade is adapted to fit into slits which are cut through the upper and lower surfaces of the X-ray cone so that the blade can penetrate through the cone, said slits being cut through the central line of the cone of the X-ray head along the direction of the central X-rays which emanate therefrom.

In accordance with this invention, an X-ray film is placed within the plate of the holder and the holder is placed within the mouth so that the X-ray film is in back of the teeth which are desired to be X-rayed. The central X-rays which are directed from the X-ray head through the cone of the X-ray are brought in parallel alignment with one of the side edges of the wedge and are focused from the point on the side edge where the separation of the side edges becomes equal to the interpupillary distance. This can be accomplished by first placing the lower projection of the blade of the alignment means over the wedge with the side edge of the wedge frictionally abutting the blade and by placing the X-ray cone on the parallel upper projection of the aligning means. By moving the top projection within the groove of the spatula blade, the distance between the X-ray cone and the side edge of the wedge can be adjusted to a desired spacing while the cone is in parallel alignment with the plane of the wedge. After this, the alignment means is removed from the wedge and the cone. Then the blade is inverted and inserted through the slits in the cone so that the top portion of the blade can rest against the side edge of the wedge. In this position, the head of the cone is guided along the side edge until the point of emanation of the X-rays in the X-ray head is directly above the point on the side edge where the separation of the side edges becomes equal to the interpupillary distance. In this manner the central X-rays are parallel to the side edge and focused from the point at which the separation of the side edges becomes equal to the interpupillary distance. After this is accomplished, the X-ray film is exposed to the X-ray. After the first film is exposed to the X-rays, a new film is placed in the holder and the holder is placed in the mouth with the cone and central X-rays in parallel alignment with the first edge of the wedge and focused from the point where the edges are separated by a distance equal to the interpupillary distance. In this manner the second picture of the exact same area is taken. These two pictures can be thereafter developed and mounted in the frames of a stereo viewer with the center of the films being separated by the interpupillary distance so that when the films are viewed through a stereoscopic viewer, a stereo effect is produced.

Other objects and advantages of this invention will become apparent from the following description, in conjunction with the annexed drawing, in which preferred embodiments of the invention are disclosed. In the drawings:

FIG. 1 is a perspective view of the film holder according to this invention;

FIG. 2 is a perspective view of the aligning means in accordance with this invention;

FIG. 3 is a side view of the holder being aligned with the cone of the X-ray in accordance with one embodiment of this invention;

FIG. 4 is a perspective view of the holder supporting an X-ray film and the cone of the X-ray in parallel and at a fixed distance with one of the side edges of the wedge;

FIG. 5 is a perspective view of the mounting guide utilized for aligning the film X-rays taken along both side walls of the wedge in a stereoscopic viewer; and FIG. 6 is a perspective view showing the holder supporting an X-ray film and the central X-rays being aligned so that they are focused from the point on one of the side edges where the separation of the side edges is equal to the interpupillary distance.

Referring to FIG. 1 wherein the holder for the X-ray film is shown, it can be seen that the construction of the holder 10 includes a flat wedge member 25 affixed to one end of a bite block 14. At the other end of the block 14 is an upwardly extending inclined rigid plate 16. The rigid plate 16 is positioned on the bite block 14 so that the vertical axis of the plate 16 makes an obtuse angle with the horizontal axis of the wedge member 25, this angle being preferably about 120°. The wedge member 25 is parallel or substantially aligned with the block 14 so that its horizontal axis substantially coincides with the block 14.

The plate 16 has a groove 18 into which the X-ray film 20 (see FIG. 4) can be inserted and retained. Furthermore plate 16 has a metal wire indicator 19 embedded on its front face 17. The metal wire indicator 19 is positioned on the front face 17 of the plate 16 so that it coincides with the vertical axis of the plate 16. Additionally the bite block 14 is constructed so that it contains a plurality of small protuberances 21 on both its upper and lower faces. These protuberances 21 prevent the block 14 from slipping when it is inserted in the mouth and clamped between the upper and lower teeth as shown in FIG. 4. The upper face of the bite block contains a central point 12 wherein its vertical axis intersects the horizontal axis of the upper face.

The wedge member 25 is flat and has two side edges 28 which uniformly taper outwardly from the bite block 14. The wedge member 25 is mounted on the block 14 so that the point of intersection of the projections of the side edges 28 upon block 14 coincides with the central point 12 of the bite block 14.

Along each of the side walls 28 is a point 30, shown in FIG. 1 at which the side edges are separated by a distance equal to the interpupillary distance i.e. the distance between the center of two eyes which is 2.5 inches. Furthermore point 30 on each of the side edges 28 is located at equal distances along edge 28 from the point of convergence of the side edges 28 which coincides with the central point 12 on the bite block 14. The wedge 25 has two end edges 31 which are joined respectively to the side edge 28 at the points 30, the end edges 31 taper inwardly from the point 30 to the point 33 at which they are joined. The provision of end edges 31, as shown in FIG. 1 is only for the purpose of delineating the point 30 where the separation between the edges 28 is equal to the interpupillary distance.

FIGS. 2 and 3 show the aligning means for aligning a dental X-ray cone 35 with the side wall 28 of the wedge 25 at the edges 30. While the alignment and focusing can be done by visual means in accordance with this invention, it is preferred to utilize the aligning means 36 for more accuracy. The first portion of the aligning means 36 comprises a flat blade 38 and a handle 39 which is attached to one of the edges of the blade. The blade 38 has a rounded outer edge 40, and a groove 42 at its central portion. The second portion of said aligning means includes two parallel spaced upper and lower projections 43 and 44 which extend perpendicularly from the blade 38 at the grooved portion 42. The upper and lower projections 43 and 44 each have perpendicularly extending flanges 45 and 45' which frictionally abut the blade 38 and are held in place by means of a wing-nut 46 and 46' which extend through groove 42. The lower projection 44 and the upper projection 43 are shaped in the form of a U shaped lip. The separation between projections 43 and 44 can be adjusted by loosening the wing-nut 46 which holds the projection 43 to the blade and moving the projections within groove 42.

As shown in FIG. 3, the bottom or lower projection 44 is adapted to rest upon the upper flat surface of the wedge 25. The upper projection 43 is adapted to be abutted by the adjacent surface of the X-ray cone 35. Said upper and lower projections thereby maintain said wedge flat surface and the adjacent surface of said cone in spaced substantially parallel relation. As shown in FIG. 3, the X-ray cone 35 has slits 47 in its upper portion and lower portions so that the blade 38 can be inserted and passed through the cone 35. The slits 47 are formed in the cone 35 so that they extend in the same direction as the central X-rays which are directed from the X-ray head (not shown) through the cone 35. In this manner when the end 40 of the blade 38 is inserted through the slits 47 in the come 35 as shown in FIG. 6 and the end is placed against one of the sides of the wedge 25, the aligning means 36 can guide the center of the cone 35 to a position where the central X-rays are focused from point 30 in parallel with the side edge 28 of the wedge so that the X-rays can be aimed at the vertical axis of the bite block in a direction parallel to the side edge 28.

When the film is mounted in the groove 18 of the holder 10 with the center of the film coinciding with the indicator 19 of the block 16, the plate 14 and film 20 are placed into the mouth of the patient in a position behind the tooth to be X-rayed, as shown in FIG. 4. In practice the holder and aligning means can be used to take X-ray pictures of the teeth in the upper jaw with the plate 16 extending upward as shown in FIG. 4 or in the lower jaw with the plate 16 extending down and under the tongue. When the X-ray film is taken, the metal wire 19 which designates the vertical axis of the holder 16 will appear along the vertical axis of the developed X-ray film 20 designating the central axis of the film.

FIG. 5 shows the means whereby the two films which are taken of one portion of the mouth can be placed in the stereoscopic viewer for stereoscopic viewing (not shown). The mounting guide 50 consists of a thin sheet of transparent plastic material or a glass plate having two wires 53 and 54 adhered by means of an adhesive to the surface of the plastic material. The two wires are positioned on the surface of the plastic material so that they are parallel to each other and are spaced by a distance equal to the interpupillary distance. The guide 50 aides in centering the films within each of the two frames of an ordinary stereoscopic viewer by moving the films within each of the frames to a position where the metal wire 19 which appears in the films coincides with the wires 53 and 54 in their respective frames. In this manner, the distance between the center of the films in the frames will be equal to the interpupillary distance. The guiding means 50 may be formed from any conventional transparent material as well as from a transparent plastic.

The apparatus of this invention is utilized to take stereoscopic X-ray films of a portion of the human mouth by means of inserting an X-ray film 20 within the slot 18 of the plate 16 of the film holder 10. A small amount of a dental modeling composition, or a wax 29 (see FIG. 4) is placed on the protuberances 21 of the upper and lower plate of the bite block 14. The holder 10 is then placed in the mouth of the patient and the patient is instructed to bite into the soft modeling composition which sets in a few moments to take an impression of the teeth biting thereon. The X-ray head of the cone is then brought into alignment with one of the side edges 28 of the wedge 25 so that the central X-rays directed through the cone are focused toward the vertical axis of the bite block in a direction parallel to one of the side edges 28 at a point 30 thereon. This alignment can be done by means of visual judgement, however, it has been found that it is more accurate to utilize the aligning means 36 hereinbefore described.

In utilizing the aligning means, the lower projection 43 is placed over the wedge 25 so that the side edge 28 frictionally abuts the flange 45 as shown in FIG. 3. The cone 35 is then placed over the upper projection 43 so that the edge of the cone rests against the blade 38. The upper projection is then moved up or down, depending upon the desired spacing of cone 35 and wedge 25, by means of wing nut 46. When the desired spacing has been reached, the wing nut 46 is tightened so that the spacing between the upper and lower projections 43 and 44 is set. In this manner the cone 35 is spaced and aligned in parallel with the plane of the side edges 28 of wedge 25, as shown in FIG. 4.

After the cone 35 and wedge 25 are spaced and aligned in the manner shown in FIGS. 3 and 4, the aligning means is removed and inverted. The inverted blade 35 is then placed through slits 47 which designate the direction of the central X-rays eminating from the X-ray head (not shown) until the top portion 40 of the blade 38 rests against the side edge 28 of the wedge 25, as shown in FIG. 4. In this portion the blade 38 is moved along edge 28 until the central X-rays are focused at the point 30 on edge 28. This is accomplished by moving the cone until the point in the head of the X-ray (not shown) from which the X-rays emanate is directly above the point 30 on the side edge 28. When the wedge 25 and cone 35 are aligned in this manner, the film is then exposed to the X-rays emanating from cone 35. After exposure, the X-ray is turned off and the holder 10 and film 20 are removed from the mouth of the patient. The film 20 is then removed from the holder 10 and a new film is inserted therein in like manner. The film holder 10 is then reinserted into the mouth, the teeth marks on the modeling composition of the bite block make exact redisposition of the holder assured, since they indicate where the holder had been positioned during the first exposure. The X-ray cone is then aligned in the same manner and spaced the same distance with the other side edge 28 of the wedge 25. The upper and lower projections 43 and 44 are used again in the same manner to reassure the proper spacing and parallelism between the bottom of the X-ray cone 35 and side edge 28 of the wedge 25 as well as the focusing of the central X-rays from the point 30 on the other side edge 28. After this alignment is completed, the second film is exposed to the X-ray.

After the second film has been exposed, the holder is removed from the mouth and the two films appropriately marked left and right, are developed, fixed and dried by any conventional means.

The films are then prepared for use in any conventional stereo viewer which contains right and left frames. The guiding means 50 is utilized so that the films are positioned correctly within the frame and the frames are spaced the proper distance, i.e. the interpupillary distance, for stereoscopic viewing. This is done by aligning the center of the film, designated by the reproduction of line 19, in the left frame with the indicator 53 and the center of the film in the right frame, also designated by the reproduction of line 19, with the indicator 54 so that the centers of the developed films are spaced in the stereoscopic viewer a distance equal to the interpupillary distance. In this manner the films within each of the frames are spaced the proper distance for stereoscopic viewing.

FIG. 4 shows an X-ray film being taken of teeth on the upper portion of the mouth. If it is desired to take an X-ray film of the lower portion of the mouth, the film holder is reversed so that the film lies directly in back of the lower tooth with the plate 16 turned downward and under the tongue, and the top of the X-ray cone is aligned with the lower surface of the wedge 25 at each of the side walls 28. In this case the top surface of the cone is aligned with the plane of the wedge 25 so that the central X-rays directed through the cone are focused from the point 30 along each of the edges paralled to the respective edge by using the aligning means 36 in the manner hereinbefore described.

While I have disclosed a preferred embodiment of the invention and have indicated various possible changes, omissions and additions which may be made therein, it will be apparent that various other changes, omissions and additions may be made in the invention without departing from the scope and spirit thereof.

What is claimed is:

1. A dental X-ray film holder for use in taking stereoscopic X-ray films of the mouth comprising a horizontally extending bite block to be held in the mouth between the teeth, a vertically extending back plate for an X-ray film fixed to one end of said block, said plate having an outer face adjacent said block having a thin metal wire positioned thereon to coincide with the vertical axis of said plate, means positioned within said plate for retaining said film within said plate, a flat wedge member extending horizontally from the other end of said block with its horizontal axis making an obtuse angle of about 120° with the vertical axis of said plate, said wedge member having two side edges tapering outwardly from said block, each of said side edges of said wedge having a point thereon at which the separation of said side edges becomes equal to the interpupillary distance, said points being equally spaced from the central point of the horizontal axis of the block along each of their respective side edges.

2. An instrument for taking stereoscopic X-ray films of the mouth comprising an X-ray cone which produces X-rays, an X-ray film holder having a horizontally extending bite block to be held in the mouth between the teeth, a vertically extending back plate for an X-ray film with its front face affixed to one end of said block, said face having a thin metal wire attached thereto and positioned to coincide with the vertical axis of said face, means positioned within said plate for retaining said film within said plate, a wedge member extending horizontally from the other end of said block with its horizontal axis making an obtuse angle with the vertical axis of said plate, said wedge member having a substantially horizontally extending flat surface and two side edges tapering outwardly from said block, each of said side edges of said wedge having a point thereon at which the separation of said side edges is equal to the interpupillary distance, said points being equally spaced from the central point of the horizontal axis of said block along each of their respective side edges, aligning means cooperating with said cone and said wedge including a first portion to align a substantially vertical, longitudinally extending plane bisecting said X-ray cone with each of said wedge side edges and a sceond portion to align in spaced substantially parallel relation said wedge flat surface with the adjacent surface of said cone, said adjusting means directing the central rays produced by the cone toward the film in a direction parallel with each of said side edges and focusing said rays from said points of each of said side edges.

3. The instrument of claim 2 wherein said X-ray cone has a slit made along the direction of the central X-rays directed through said cone, said slit extending from the upper surface of the cone to the lower surface of the cone, said aligning means first portion including a vertical blade having an upper surface adapted to fit within said slit in said cone, said aligning means second portion including spaced parallel upper and lower projections which extend perpendicularly from the central portion of said blade.

4. The instrument of claim 3 wherein said obtuse angle is approximately 120° and the block of said holder contains a plurality of protuberances on its upper and lower surfaces which prevent the block from slipping when it is positioned within the human mouth.

5. An instrument as recited in claim 2 including means for mounting a pair of exposed X-ray films in a stereoscopic viewer, one of said pair of films having been exposed while said cone was aligned with each of said wedge side edges, said mounting means including a pair of parallel wire members spaced a distance equal to the interpupillary distance, each of said films having thereon the image of the thin metal wire attached to the front face of said film holder back plate, said mounting means being adapted to receive each of said films with the image aligned with said image aligned with the corresponding mounting means wire member.

6. An instrument as recited in claim 4 wherein said mounting means includes a sheet of transparent material, said mounting means wire members being adhered to one surface of said sheet in spaced relation.

7. A method for taking stereoscopic X-ray dental films of the mouth by means of an X-ray cone comprising:
(a) inserting and positioning between the teeth of the human mouth a horizontally extending bite block having affixed to its end which is inserted between the teeth a vertically extending back plate containing an X-ray film therein, and a wedge member extending out of the mouth from the other end of said bite block with its horizontal axis making an obtuse angle with the vertical axis of said plate, said wedge member having a substantially horizontally extending flat surface and two side edges tapering outwardly from said block, each of said side edges of said wedge having a point thereon at which the separation of said side edges becomes equal to the interpupillary distance, said points being equally spaced from the central point on the horizontal axis of the plate along each of their respective side edges;
(b) aligning the X-ray cone with one of the side edges of said wedge and with said flat surface to direct the central X-rays through said cone towards the films in a direction parallel with the aligned side edge and to focus said central rays from said point on said side edge;
(c) exposing the film to said X-rays while said X-ray cone is aligned with said side edge and flat surface;
(d) removing the bite block from the mouth and thereafter removing the exposed X-ray film from the plate;
(e) reinserting a second X-ray film within the plate and repositioning said bite block in the same position between the teeth within the mouth;
(f) aligning the X-ray cone with the other side edge of said wedge and with said flat surface to direct the central rays through said cone toward the film in a direction parallel with the other of said side edges and to focus said central rays from said point on said side edge;
(g) exposing the film to X-ray from said cone while said cone is aligned with the other of said side edges and said flat surface and thereafter; and
(h) removing the bite block from the mouth and developing both of said X-ray films.

8. The method according to claim 7 wherein said bite block contains a molding compound on its upper surface and said bite block is repositioned within said mouth by means of the teeth impression taken with said molding compound.

9. The method according to claim 8 wherein said cone is aligned in parallel relation with the side walls of said wedge by means of a vertical blade having spaced upper and lower parallel projections extending perpendicularly therefrom with the upper projection engaging a portion of the outer surface of said X-ray cone and the lower projection engaging the flat surface of said wedge, said blade engaging the side edge of the wedge.

10. The method according to claim 7 including mounting said developed X-ray films in a stereoscopic viewer including means adapted to receive said films having a pair of parallel wire members spaced a distance equal to the interpupillary distance, aligning one of said films with each of said wire members, and focusing said stereoscopic viewer until said two wire members appear to occupy the same space.

References Cited

UNITED STATES PATENTS

| 1,808,176 | 6/1931 | Pieper et al. | 350—139 |
| 2,753,461 | 7/1956 | Goldberg | 250—70 |

FOREIGN PATENTS

| 708,993 | 5/1954 | Great Britain. |
| 257,575 | 10/1948 | Switzerland. |

RALPH G. NILSON, Primary Examiner.

A. L. BIRCH, Assistant Examiner.

U.S. Cl. X.R.

250—70